(12) United States Patent
Odvody et al.

(10) Patent No.: US 10,083,029 B2
(45) Date of Patent: Sep. 25, 2018

(54) DETECT APPLICATION DEFECTS BY CORRELATING CONTRACTS IN APPLICATION DEPENDENCIES

(71) Applicant: Red Hat, Inc., Raleigh, NC (US)

(72) Inventors: Pavel Odvody, Praha (CZ); Fridolin Pokorny, Modrý Kameň (SK); Jan Chaloupka, Ivanovice na Hané (CZ)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/347,474

(22) Filed: Nov. 9, 2016

(65) Prior Publication Data

US 2018/0129494 A1    May 10, 2018

(51) Int. Cl.
G06F 9/44      (2018.01)
G06F 8/71      (2018.01)
G06F 9/54      (2006.01)

(52) U.S. Cl.
CPC .............. G06F 8/71 (2013.01); G06F 9/541 (2013.01)

(58) Field of Classification Search
CPC .................................. G06F 8/71; G06F 9/541
USPC ......................................................... 717/121
See application file for complete search history.

(56) References Cited

U.S. PATENT DOCUMENTS

| | | | | |
|---|---|---|---|---|
| 5,485,616 A | * | 1/1996 | Burke ..................... | G06F 8/434 717/133 |
| 5,805,899 A | * | 9/1998 | Evans ...................... | G06F 8/71 717/170 |
| 5,974,428 A | * | 10/1999 | Gerard ..................... | G06F 8/71 707/695 |
| 6,175,855 B1 | * | 1/2001 | Reich ................. | G06F 9/44536 709/202 |
| 6,216,212 B1 | * | 4/2001 | Challenger ....... | G06F 17/30902 707/999.008 |
| 6,366,876 B1 | * | 4/2002 | Looney ..................... | G06F 8/10 703/25 |
| 6,370,681 B1 | * | 4/2002 | Dellarocas ............... | G06F 8/20 717/110 |

(Continued)

OTHER PUBLICATIONS

Steven Pratschner, *Simplifying Deployment and Solving DLL Hell with the .NET Frameworks*, Nov. 2001, Microsoft Corporation, https://msdn.microsoft.com/en-us/library/ms973843.aspx.

(Continued)

*Primary Examiner* — Francisco Aponte
(74) *Attorney, Agent, or Firm* — Haynes and Boone, LLP

(57) ABSTRACT

An example method of detecting incompatibility between an application and an application dependency includes identifying a first set of contracts exposed in a first version of an application dependency. Each contract includes a symbol and a corresponding signature. The example method also includes comparing the first set of contracts to a corresponding second set of contracts exposed in a second version of the application dependency. The example method further includes determining, based on the comparing, whether the first set of contracts matches the second set of contracts. If the first set of contracts matches the second set of contracts, an indication that the second set of contracts is compatible with the application is provided. If the first set of contracts does not match the second set of contracts, an indication that the second set of contracts is not compatible with the application is provided.

20 Claims, 6 Drawing Sheets

(56) References Cited

U.S. PATENT DOCUMENTS

| | | | |
|---|---|---|---|
| 6,442,753 B1* | 8/2002 | Gerard | G06F 8/71 717/166 |
| 6,826,750 B1* | 11/2004 | Curtis | G06F 9/44536 717/170 |
| 6,847,970 B2 | 1/2005 | Keller et al. | |
| 6,874,020 B1* | 3/2005 | Da Palma | G06F 9/548 709/202 |
| 6,931,626 B2* | 8/2005 | Sheedy | G06F 8/71 715/234 |
| 7,076,804 B2* | 7/2006 | Kershenbaum | G06F 21/53 713/167 |
| 7,124,408 B1* | 10/2006 | Parthasarathy | G06F 21/51 713/167 |
| 7,143,395 B2* | 11/2006 | Applin | G06F 8/71 717/130 |
| 7,237,236 B2* | 6/2007 | Kershenbaum | G06F 8/72 717/151 |
| 7,287,259 B2* | 10/2007 | Grier | G06F 8/71 717/164 |
| 7,383,541 B1* | 6/2008 | Banks | G06F 8/65 717/126 |
| 7,386,839 B1 | 6/2008 | Golender et al. | |
| 7,434,202 B2* | 10/2008 | Kramer | G06F 8/71 717/102 |
| 7,496,904 B2* | 2/2009 | Srivastava | G06F 11/368 717/133 |
| 7,571,427 B2* | 8/2009 | Wang | G06F 8/71 707/999.202 |
| 7,640,532 B2* | 12/2009 | Jain | G06F 8/20 717/102 |
| 7,706,687 B1* | 4/2010 | Monga | H04L 12/24 398/25 |
| 7,849,459 B2* | 12/2010 | Burkhart | G06F 8/60 717/108 |
| 7,882,501 B1* | 2/2011 | Carlson | G06F 8/67 709/203 |
| 7,996,820 B2* | 8/2011 | Auvenshine | G06F 9/5061 705/32 |
| 8,060,871 B2* | 11/2011 | Bernabeu-Auban | G06F 8/65 717/120 |
| 8,230,413 B2* | 7/2012 | Bates | G06F 11/3664 717/120 |
| 8,312,417 B2* | 11/2012 | Kohli | G06F 8/34 717/104 |
| 8,381,242 B2* | 2/2013 | Berg | G06F 21/577 725/25 |
| 8,387,032 B1* | 2/2013 | Goldman | G06F 8/54 717/110 |
| 8,418,161 B2* | 4/2013 | Bauchot | G06F 9/44536 717/165 |
| 8,443,342 B2 | 5/2013 | Rohde et al. | |
| 8,495,603 B2* | 7/2013 | Archer | G06F 8/443 717/140 |
| 8,549,490 B2* | 10/2013 | Dolby | G06F 8/73 717/133 |
| 8,555,250 B2 | 10/2013 | Fanning et al. | |
| 8,601,439 B2* | 12/2013 | Aslam | G06F 8/60 717/120 |
| 8,624,898 B1* | 1/2014 | Bugaj | G06T 13/00 345/418 |
| 8,689,229 B2* | 4/2014 | Tajima | G06F 9/4881 709/226 |
| 8,738,589 B2* | 5/2014 | Stark | G06F 9/44536 707/695 |
| 8,793,800 B2* | 7/2014 | Berg | G06F 21/577 726/25 |
| 8,904,004 B2* | 12/2014 | Havemose | G06F 8/61 709/226 |
| 8,930,886 B2* | 1/2015 | Dunker | G06F 8/75 717/104 |
| 8,930,916 B1* | 1/2015 | Soeder | G06F 8/75 717/131 |
| 8,966,457 B2* | 2/2015 | Ebcioglu | G06F 17/5045 716/105 |
| 9,038,037 B1* | 5/2015 | Biggerstaff | G06F 8/437 717/108 |
| 9,055,120 B1* | 6/2015 | Firman | G06F 8/60 |
| 9,075,695 B2* | 7/2015 | Pei | G06F 8/71 |
| 9,086,937 B2* | 7/2015 | Arrouye | G06F 8/61 |
| 9,118,520 B1* | 8/2015 | Mao | G06Q 10/04 |
| 9,158,530 B2* | 10/2015 | Bennah | G06F 8/65 |
| 9,164,742 B2 | 10/2015 | Kraft | |
| 9,195,502 B2* | 11/2015 | Chung | G06F 9/5005 |
| 9,208,055 B2* | 12/2015 | Fink | G06T 11/206 |
| 9,430,200 B1* | 8/2016 | Trofin | G06F 8/443 |
| 9,432,798 B2* | 8/2016 | Raju | H04W 4/008 |
| 9,483,255 B2* | 11/2016 | Katsaros | G06F 8/68 |
| 9,519,468 B2* | 12/2016 | Goetz | G06F 8/54 |
| 9,678,729 B2* | 6/2017 | Goetz | G06F 8/443 |
| 2002/0131404 A1* | 9/2002 | Mehta | G06F 8/61 370/352 |
| 2004/0003390 A1* | 1/2004 | Canter | G06F 8/61 717/178 |
| 2005/0278718 A1* | 12/2005 | Griffith | G06F 9/445 717/175 |
| 2006/0048024 A1* | 3/2006 | Lidin | G01R 31/31813 714/724 |
| 2007/0169103 A1* | 7/2007 | Bhatkhande | G06F 9/44536 717/170 |
| 2007/0256069 A1* | 11/2007 | Blackman | G06F 8/433 717/170 |
| 2008/0114957 A1* | 5/2008 | Safa | G06F 21/80 711/163 |
| 2008/0201701 A1* | 8/2008 | Hofhansl | G06F 8/60 717/168 |
| 2008/0270971 A1* | 10/2008 | Agrawal | G06F 17/50 717/102 |
| 2008/0288965 A1* | 11/2008 | Grechanik | G06F 8/36 719/328 |
| 2009/0133014 A1* | 5/2009 | Laurila | G06F 8/60 717/174 |
| 2009/0138898 A1* | 5/2009 | Grechanik | G06F 8/36 719/328 |
| 2011/0078672 A1* | 3/2011 | Stark | G06F 9/44536 717/166 |
| 2011/0185339 A1* | 7/2011 | Andrade | G06F 8/20 717/104 |
| 2011/0209133 A1* | 8/2011 | Mahajan | G06F 8/43 717/170 |
| 2012/0222025 A1* | 8/2012 | Pandit | G06F 9/44552 717/170 |
| 2013/0055194 A1* | 2/2013 | Weigert | G06F 8/10 717/104 |
| 2013/0055212 A1* | 2/2013 | Weigert | G06F 8/10 717/126 |
| 2013/0117725 A1* | 5/2013 | Bnayahu | G06F 8/30 717/101 |
| 2013/0125097 A1* | 5/2013 | Ebcioglu | G06F 17/5045 717/136 |
| 2013/0305230 A1* | 11/2013 | Inoue | G06F 8/443 717/153 |
| 2013/0326481 A1* | 12/2013 | Kannan | G06F 8/71 717/123 |
| 2013/0347094 A1* | 12/2013 | Bettini | H04L 63/0245 726/11 |
| 2014/0053057 A1* | 2/2014 | Reshadi | G06F 17/2247 715/234 |
| 2014/0096129 A1* | 4/2014 | Kimmet | G06F 8/61 717/177 |
| 2014/0282457 A1* | 9/2014 | Chow | G06F 8/54 717/164 |
| 2014/0359601 A1* | 12/2014 | Constable | G06F 8/61 717/175 |
| 2015/0113514 A1* | 4/2015 | Chakradhar | G06F 8/51 717/149 |
| 2015/0178062 A1* | 6/2015 | Adderly | G06Q 10/06 717/170 |

(56) References Cited

U.S. PATENT DOCUMENTS

| | | | |
|---|---|---|---|
| 2015/0234653 A1* | 8/2015 | Fortune | G06F 8/71 717/121 |
| 2015/0277889 A1* | 10/2015 | Arrouye | G06F 8/61 717/175 |
| 2016/0062878 A1* | 3/2016 | Westrelin | G06F 9/4552 717/130 |
| 2016/0098564 A1 | 4/2016 | Wysopal et al. | |
| 2016/0179478 A1* | 6/2016 | Bates | G06F 8/34 717/113 |
| 2016/0179503 A1* | 6/2016 | Bates | G06F 8/34 717/101 |
| 2016/0239546 A1* | 8/2016 | Cuomo | G06F 8/10 |

OTHER PUBLICATIONS

*Dependency Walker 2.2,* http://www.dependencywalker.com/, Published Nov. 28, 1999.

Edward Aftandilian, Raluca Sauciuc, Siddharth Priya, Sundaresan Krishnan, *Building Useful Program Analysis Tools Using an Extensible Java Compiler,* http://static.googleusercontent.com/media/research.google.com/en//pubs/archive/38275.pdf, IEEE, Published Jul. 23, 2012.

*How do I tell Maven to use the Latest version of a Dependency?* http://stackoverflow.com/questions/30571/how-do-i-tell-maven-to-use-the-latest-version-of-a-dependency, Publised Aug. 27, 2008.

\* cited by examiner

DETECT APPLICATION DEFECTS BY CORRELATING CONTRACTS IN APPLICATION DEPENDENCIES

BACKGROUND

The present disclosure generally relates to computing devices, and more particularly to detecting incompatibility between an application and an application dependency.

Platforms exist for developing, shipping, and running applications. For example, a platform may allow developers to separate their applications from the infrastructure and treat the infrastructure like a managed application. The platform may help a developer ship software code faster, test faster, deploy faster, and shorten the cycle between writing and running the code. The platform may combine kernel containerization features with workflows and tooling that help the developer manage and deploy applications.

Continuous Integration (CI) is a development practice that assists in producing applications ready for deployment. During the life cycle of a project, application developers may integrate small pieces of software into a project. As the project grows, different application developers may work on different aspects of the application. Additionally, the successful execution of an application may depend on other resources, which may be referred to as application dependencies.

BRIEF SUMMARY

Methods, systems, and techniques for detecting incompatibility between an application and an application dependency are provided.

An example method of detecting incompatibility between an application and an application dependency includes identifying a first set of contracts exposed in a first version of an application dependency. An application is dependent on the first version, and each contract includes a symbol and a corresponding signature. The example method also includes comparing the first set of contracts to a corresponding second set of contracts exposed in a second version of the application dependency. Each contract of the second set includes a symbol and a corresponding signature. The example method further includes determining, based on the comparing, whether the first set of contracts matches the second set of contracts. The example method also includes in response to a determination that the first set of contracts matches the second set of contracts, providing an indication that the second set of contracts is compatible with the application.

An example system for detecting incompatibility: between an application and an application dependency includes a static analyzer that identifies a first set of contracts exposed in a first version of an application dependency. An application is dependent on the first version, and each contract of the first set includes a symbol and a corresponding signature. The system also includes a compatibility module that compares the first set of contracts to a corresponding second set of contracts exposed in a second version of the application dependency and determines, based on the one or more comparisons, whether the first set of contracts matches the second set of contracts. Each contract of the second set includes a symbol and a corresponding signature. The system further includes a logger that in response to a determination that the first set of contracts does not match the second set of contracts, provides an indication that the second set of contracts is not compatible with the application.

An example machine-readable medium includes a plurality of machine-readable instructions that when executed by one or more processors are adapted to cause the one or more processors to perform a method including: identifying a first set of contracts exposed in a first version of an application dependency, an application being dependent on the first version, and each contract of the first set including a symbol and a corresponding signature; comparing the first set of contracts to a corresponding second set of contracts exposed in a second version of the application dependency, each contract of the second set including a symbol and a corresponding signature; determining, based on the comparing, whether the second set of contracts is compatible with the application; and in response to a determination that the second set of contracts is not compatible with the application, providing an indication that the second set of contracts is not compatible with the application.

BRIEF DESCRIPTION OF THE DRAWINGS

The accompanying drawings, which form a part of the specification, illustrate examples and together with the description, further serve to explain the principles of the disclosure. In the drawings, like reference numbers may indicate identical or functionally similar elements. The drawing in which an element first appears is generally indicated by the left-most digit in the corresponding reference number.

DETAILED DESCRIPTION

Figure 1:
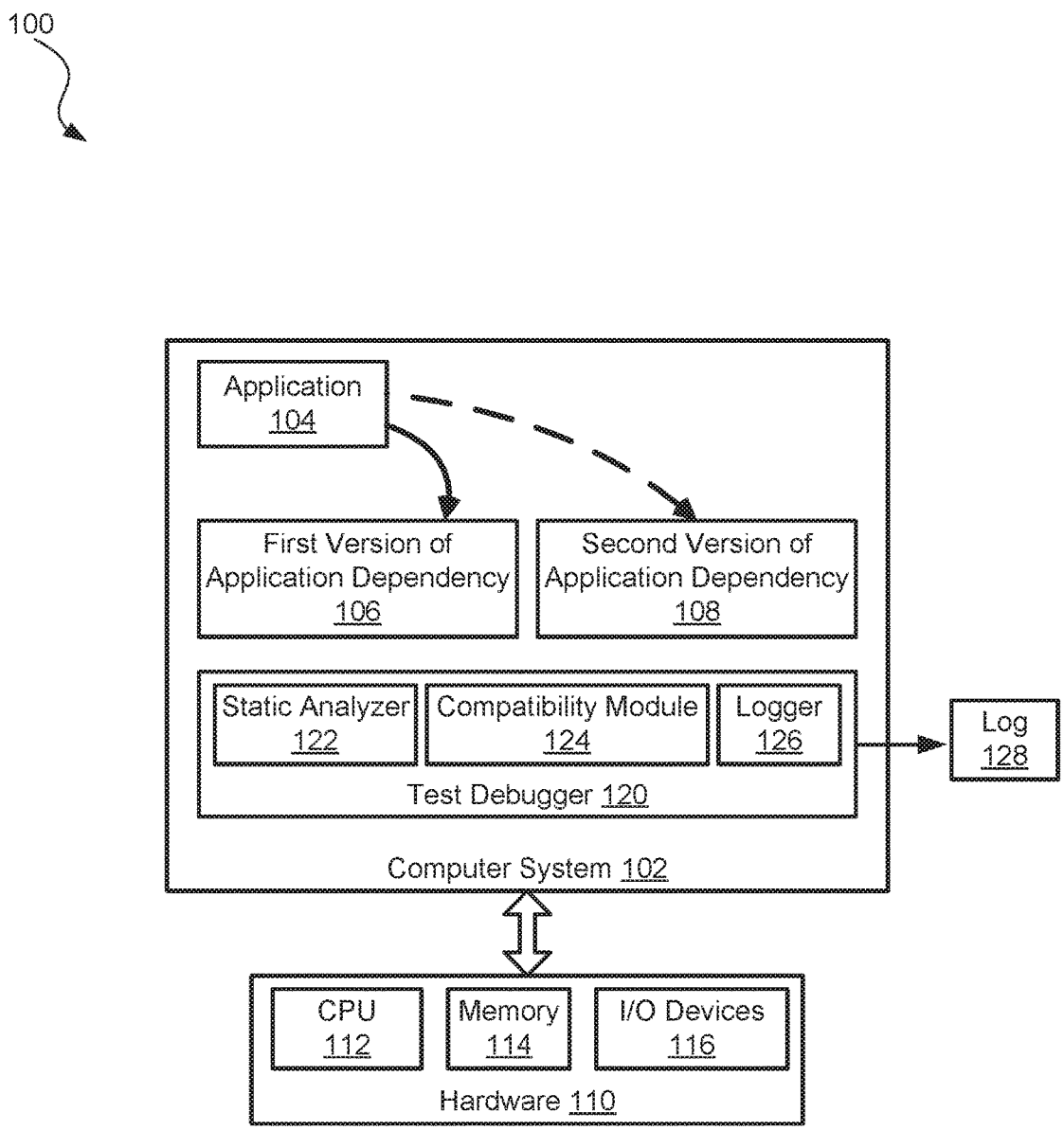
FIG. 1 is a diagram illustrating an example system for detecting defects in an application dependency upon which an application is dependent, without rebuilding the application with the application dependency.

It is to be understood that the following disclosure provides many different examples for implementing different features of the present disclosure. Some examples may be practiced without some or all of these specific details. Specific examples of components, modules, and arrangements may be described below to simplify the present disclosure. These are, of course, merely examples and are not intended to be limiting. Additionally, one or more of the examples disclosed below may be combined together.

An application may be compatible with an application dependency. An application dependency is not directly part of the application, but at build time or runtime, the code of the application and the application dependency at some point in time is executed within the context of the application. At some later point in time, a new or upgraded version of the application dependency may be available, and developers may desire to use this version for a variety of reasons. For example, the new version may provide security or bug fixes that were not available in the previous version.

Development tools may be used to rebuild the application with the new version of the application dependency. A build of the application may include dependency checking, compiling, and linking the application with its dependencies. A build may fail for a variety of reasons. Although the cause of an error may be for different reasons, the same error may be returned to a user or logged into a debug log, making it difficult to resolve the issue. Accordingly, a problem may arise when an application build fails but a developer is unable to grasp the root cause of the errors because the error codes returned are generic and/or can be triggered by any number of causes.

A solution to this problem of nebulous error codes may include determining the root causes of the errors and providing this specific error information to the user or to a debug log. The debug information may be helpful for users to better understand and debug the application. In an example, the root cause of an error may be that a set of contracts in the initial version of the application dependency is invoked by the application and is not fulfilled by the new version of the application dependency. If a test suite does not test for this error, the error code would not be able to provide this information. The present disclosure may provide techniques to determine whether a set of contracts exposed in an initial version of the application dependency and used by the application is fulfilled by a corresponding set of contracts in the new version. If the new version does not fulfill these contracts, this information may be provided to the user or a debug log for further analysis. Accordingly, errors that a test suite may not be able to catch may be caught using the teachings of the present disclosure.

Additionally, a build of the application may include dependency checking, compiling, and linking the application with its dependencies. Accordingly, a huge amount of time may be consumed in ensuring the compatibility of the application with the initial version of the application dependency. A problem may arise in the amount of time consumed to ensure that the new version of the application dependency is also compatible with the application.

A solution to this problem may leverage the knowledge that the initial version of the application dependency is compatible with the application. In an example, a set of contracts exposed in the initial version is compared to a corresponding set of contracts exposed in the new version of the application dependency. If these two sets of contracts match, then the contracts used by the application in the initial version are fulfilled by the new version and thus, the new version of the application dependency is compatible with the application. The present disclosure provides techniques to detect whether the new version of the application dependency is compatible with the application, without rebuilding the application. Additionally, an error code may provide information regarding the root cause of the incompatibility as being the particular contracts exposed in the new version.

The present disclosure provides techniques for detecting incompatibility between an application and an application dependency, without rebuilding the application with the application dependency. Unless specifically stated otherwise, as apparent from the following discussion, it is appreciated that throughout the description, discussions utilizing terms such as "determining," "storing," "applying," "receiving," "sending," "comparing," "executing," "identifying," "modifying," "providing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

FIG. 1 is a diagram illustrating an example system 100 for detecting defects in an application dependency upon which an application is dependent, without rebuilding the application with the application dependency. System 100 may be used for automating the creation and distribution of computer program applications. System 100 includes a computer system 102 and hardware 110. In some examples, computer system 102 is coupled over a network (not shown). The network may be a private network (e.g., local area network (LAN), wide area network (WAN), intranet, etc.), a public network (e.g., the Internet), or a combination thereof. The network may include various configurations and use various protocols including virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, Wi-Fi and Hypertext Transfer Protocol (HTTP), and various combinations of the foregoing.

Computer system 102 may be coupled to hardware 110 such as central processor unit (CPU) 112 for executing software (e.g., machine-readable instructions) and using or updating data stored in memory 114. Hardware 110 may include more than one CPU 112. A "CPU" may also be referred to as a "processor" or "physical processor" herein. A CPU shall refer to a device capable of executing instructions encoding arithmetic, logical, or I/O operations. In an example, a CPU may follow the Von Neumann architectural model and may include an arithmetic logic unit (ALU), a control unit, and a plurality of registers. In a further aspect, a CPU may be a single-core CPU that is typically capable of executing one instruction at a time (or processing a single pipeline of instructions), or a multi-core CPU that may simultaneously execute multiple instructions. In another aspect, a CPU may be implemented as a single-integrated circuit, two or more integrated circuits, or may be a component of a multi-chip module (e.g., in which individual microprocessor dies are included in a single integrated circuit package and hence share a single socket).

Memory 114 may be one or more of many different types of memory. "Memory" herein shall refer to volatile or non-volatile memory, such as random access memory (RAM), read-only memory (ROM), electrically erasable ROM (EEPROM), or any other memory capable of storing data. Some types of memory, such as solid state drives typically have relatively larger storage volume but relatively slower performance. Other types of memory, such as those used for RAM, are optimized for speed and may be referred to as "working memory" or "main memory." The various types of memory may store information in the form of software and data. The software may include an operating system and various other software applications. Additionally, hardware 110 may include other I/O devices 116.

Computer system 102 includes an application 104 that is executable on CPU 112. Application 104 may be dependent on an application dependency, which may refer to a resource that application 104 uses in order to successfully execute. An application dependency is not directly part of application 104, but at build time or runtime, the code of application 104 and application dependency at some point in time is executed within the context of application 104. In some examples, application dependency is an application package, library, or an application programming interface (API) exposed by another application, etc. In these examples, application 104 may request the services of any one of these application dependencies.

A team of application developers may work together to deploy application 104 by tracking its progress in a code repository, with each additional commit issuing a build of the application. An application build may be dependent on the programing language in which application 104 is written. A dynamic programming language may refer to a class of high-level programming languages which, at runtime, execute many common programming behaviors that static programming languages perform during compilation. The execution of a dynamic programming language depends on the current context, which may change at each line of code. For example, a variable may be given another data type by assigning a new value to that variable.

In contrast, the C++ programming language is a static programming language. For the C++ programming language, a build may include dependency checking, compiling, and linking. During dependency checking, the build tool determines which files (e.g., application dependencies) have changed and which ones should be recompiled. The configuration files may include a directed acyclic graph describing the build dependencies.

A compiler may be used to compile source code of a program into object code. The source code may be written in a high-level programming language and represented as a text file or a logically related group of text files. Object code may refer to native machine code that is executable on a hardware platform (e.g., x86). Compilation of the input source code may include a plurality of compilation phases. In an example, the successive compilation phases may include lexical analysis, parsing (or syntax analysis), semantic (or context-dependent or type-dependent) analysis, intermediate code generation, code optimization, and code generation. The compilation phases associated with different compilers may be different. Each phase takes as the input the result of the previous phase and passes its output to the next phase. During the linking phase, a linker may take one or more object files generated by the compiler and combine them into a single executable tile, library file, or other object file.

If an application build succeeds, the application may be promoted to a next stage, such as the production stage. A developer may develop on one or more applications and services, and then integrate them into a continuous integration and deployment workflow. The developer may write software code locally and share her development stack via the platform with her colleagues. When ready, developers may push their software code and the stack they are developing onto a test environment and execute tests. From the testing environment, the developers then push the images into production and deploy code.

Computer system 102 includes a test debugger 120 that analyzes and provides debug information about application 104 and its dependencies. Test debugger 120 may provide information on whether a new version of an application dependency will break the application and may do so without compiling, building, running, or executing the new version of the application dependency.

During an application lifecycle build phase, the development of the application revolves around many steps, including compiling of source code, resource generation, and packaging of the solution. In the build phase, the output is dependent on the CPU architecture that it was designed for. Automation may continually integrate any checked-in changes, thus rebuilding the project automatically.

In the example illustrated in FIG. 1, application 104 may depend on an application dependency, which may have multiple versions. For example, application 104 may be dependent on a first version of application dependency 106, which may have already been tested and confirmed as being compatible with application 104. An application dependency is compatible with an application if the application dependency is used by and has successfully executed within the context of the application. A developer may desire to upgrade the usage of first version of application dependency 106 to second version of application dependency 108, without rebuilding the application.

Test debugger 120 includes a static analyzer 122, a compatibility module 124, and a logger 126. Static analyzer 122 may parse and analyze source code of application 104, first version of application dependency 106, and second version of application dependency 108 to identify a set of contracts and its usage by application 104. A contract includes a symbol and a signature corresponding to the symbol. A symbol is a piece of source code that may be referenced by a well-known name. In an example, a symbol is a variable, function, or class. A signature corresponding to a symbol is a programming language semantic that describes the symbol. For example, if the symbol is a variable, the corresponding signature may provide information regarding the variable's name and data type. If the symbol is a function, the corresponding signature may provide information regarding the function's name, return type, and description of the arguments (e.g., the number of parameters the function expects and each of the parameter data types). If the symbol is a method, the corresponding signature may provide information regarding the method's name, return type, and description of the arguments (e.g., the number of parameters the method expects and each of the parameter data types). If the symbol if a class, the signature may provide the class's name, data type, and whether the class is public or private. These are merely examples, and a symbol may include other well-known names and a signature may include other descriptions.

Static analyzer 122 may perform static analysis on source code by parsing it and building an abstract syntax tree. As static analyzer 122 parses the source code, static analyzer 122 may insert components of the source code into the abstract syntax tree. Static analyzer 122. identifies a set of contracts exposed in first version of application dependency 106 and a set of contracts exposed in second version of application dependency 108. Compatibility module 124 may compare these sets of contracts to each other. Based on this comparison, compatibility module 124 may determine whether the set of contracts exposed in second version of application dependency 108 is compatible with application 104, without rebuilding application 104. Although two versions of an application dependency are discussed as being compared, it should be understood that more than two versions of an application dependency may be compared.

Additionally, different versions of more than one application dependency may be tested in accordance with the present disclosure.

In some examples, compatibility module 124 compares a contract exposed in first version of application dependency 106 to a corresponding contract exposed in second version of application dependency 108. A first contract in first version of application dependency 106 may correspond to a second contract in second version of application dependency 108 if the second contract represents or takes the place of the first contract in the application dependency. For example, the first and second contracts may have the same name, but the same or different signatures.

Logger 126 may provide an indication of whether the set of contracts exposed in second version of application dependency 108 is compatible with application 104. Logger 126 may log this information into a log 128. Accordingly, test debugger 120 may analyze the source code of application 104, first version of application dependency 106, and second version of application dependency 108 and determine whether second version of application dependency 108 is compatible with application 104, without executing the analyzed modules to arrive at this determination. In an example, logger 126 provides an error code indicating that one or more contracts exposed in second version of application dependency 108 does not fulfill one or more contracts exposed in first version of application dependency 106 and used by application 104.

In some examples, test debugger 120 implements the following equation:

$N_{defects} = D(C_{new}, C_{old})$, with D being a function counting the number of semantically different contracts C between old and new versions of an application dependency.

The knowledge that first version of application dependency 106 is compatible with application 104 may be leveraged to determine whether a new version of the application dependency is compatible with application 104. By comparing the contracts exposed in first version of application dependency 106 to its corresponding contracts exposed in second version of application dependency 108, it may be unnecessary to rebuild application 104. This may be advantageous because rebuilding an application may be time consuming. Additionally, debugging a failed build may not provide valuable information to developers regarding why the build failed. For example, the debug information may not provide an indication to the developers that contracts exposed in second version of application dependency 108 and used by application 104 are incompatible with the application.

Figure 2:
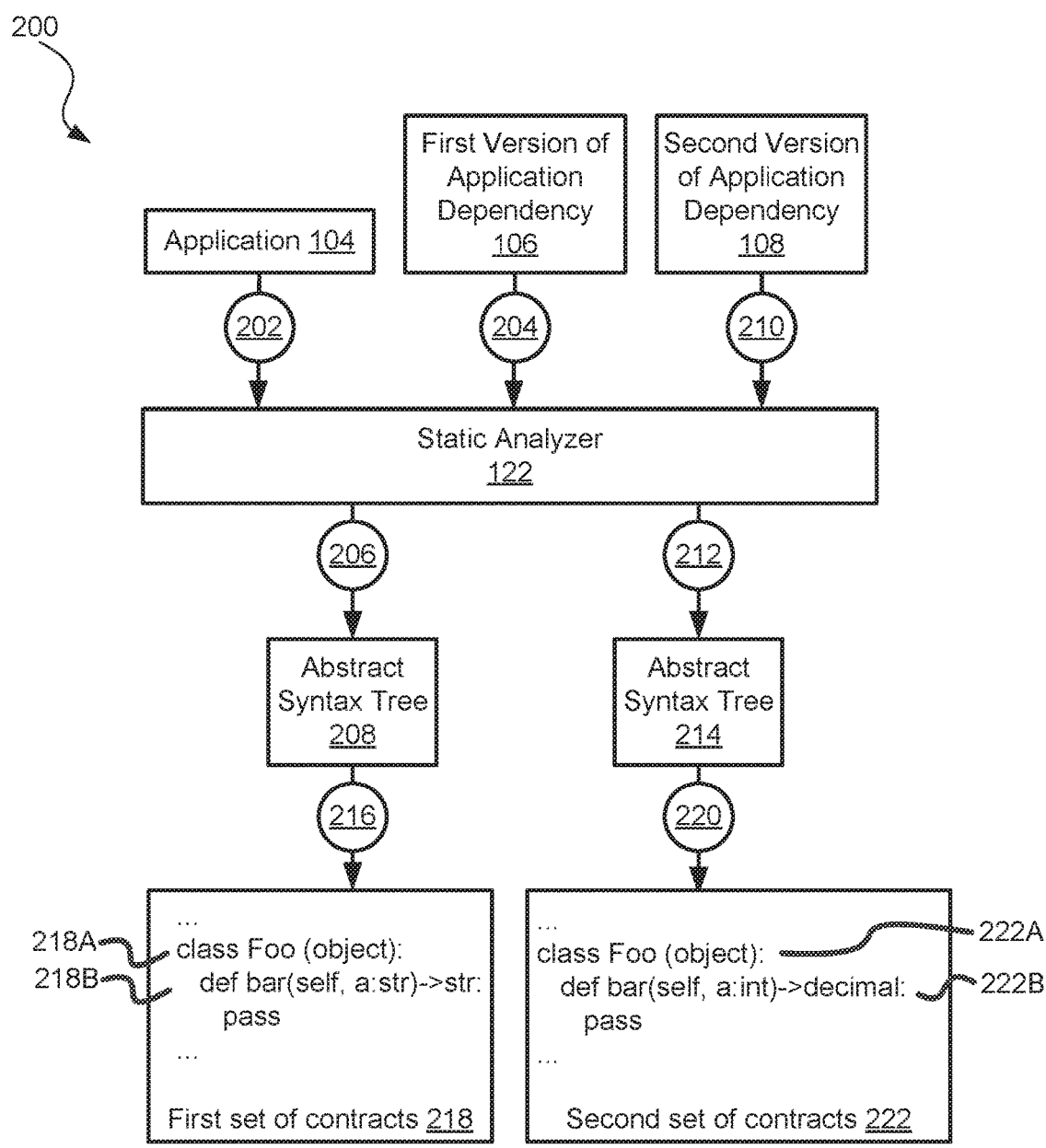
FIG. 2 is an example process flow for identifying contracts exposed in an application dependency upon which an application is dependent, without rebuilding the application with the application dependency.

FIG. 2 is an example process flow 200 for identifying contracts exposed in an application dependency upon which an application depends, without rebuilding the application with the application dependency. At action 202, static analyzer 122 analyzes source code of application 104. Static analyzer 122 may analyze source code of application 104 by, for example, parsing it and determining application 104's usage of first version of application dependency 106. In this way, a developer may be able to figure out application 104's behavior (e.g., its system calls, requested external resources, and/or method invocations) before application 104 actually implements the behavior.

At action 204, static analyzer 122 analyzes source code of first version of application dependency 106. At action 206, static analyzer 122 generates an abstract syntax tree 208, which is a graphical representation of the source code of first version of application dependency 106. At action 210, static analyzer 122 analyzes source code of second version of application dependency 108. At action 212, static analyzer 122 generates an abstract syntax tree 214, which is a graphical representation of the source code of second version of application dependency 108. Static analyzer 122 may analyze the source code of an application dependency by parsing it component-by-component. Static analyzer 122 may generate an abstract syntax tree by inserting components from the application dependency source code into the tree. The abstract syntax tree may include a plurality of nodes, each connected via edges, and each node in the abstract syntax tree may include a component from the analyzed source code. As static analyzer 122 parses the source code, static analyzer 122 may insert the parsed components into the abstract syntax tree.

At action 216, static analyzer 122 identifies a first set of contracts 218 exposed in first version of application dependency 106. In some examples, static analyzer 122 analyzes the source code of application 104 with first version of application dependency 106 to identify first set of contracts 218. First set of contracts 218 may be those contracts in first version of application dependency 106 that are invoked by application 104. The abstract syntax tree may be used to figure out relations between particular nodes in the graph. Static analyzer 122 may identify a set of contracts by "walking" the abstract syntax tree and searching for nodes defining variables, functions, methods, or classes. Static analyzer 122. may identify a symbol and its corresponding signature in the abstract syntax tree. In an example, static analyzer 122 analyzes application 104 and determines which contracts it invokes within first set of contracts 218. Static analyzer 122 may identify the invoked contracts by analyzing the source code of application 104 and its usage of first set of contracts 218. Application 104 invokes a contract if application 104 uses the contract (e.g., makes a function call).

At action 220, static analyzer 122 identifies a second set of contracts 222 exposed in second version of application dependency 108. In some examples, static analyzer 122 identifies second set of contracts 222 by identifying those contracts in second version of application dependency 108 that correspond to first set of contracts 218. Static analyzer 122 may identify a given contract of first set of contracts 218. The corresponding contract in second version of application dependency 108 is the updated version of the given contract. The corresponding contract may he the same as or different from the given contract.

In some examples, static analyzer 122 identifies three sets of contracts, the first set being the contracts exposed in first version of application dependency 106, the second set being the contracts exposed in second version of application dependency 108, and the third set being the contracts that are used by application 104. Static analyzer 122 may compute a union between the three sets of contracts. Each time the three sets of contracts overlap, test debugger 120 may analyze these contracts for a potential defect. Test debugger 120 may analyze the changed contracts and determine if the changes introduced a defect. As discussed further below, test debugger 120 may determine whether the particular change of contract introduced a defect into application 104. Test debugger 120 may determine that a contract of second version of application dependency 108 is compatible with application 104 based on, for example, type semantics (e.g., storage qualifiers and type qualifiers), argument ordering, symbol name, visibility, and/or scope. Techniques applied by test debugger 120 may be different per each language, and sometimes per different versions of a language. In an example, an input parameter to test debugger 120 may be a desired version of the language runtime to use.

In some examples, first version of application dependency 106 and second version of application dependency 108 are written in the PYTHON programming language. In the example illustrated in FIG. 2, first set of contracts 218 includes "class Foo (object): def bar(self, a:str)->str: pass," and second set of contracts 222 includes "class Foo (object): def bar(self, a:int)->decimal: pass." A contract includes a symbol and a signature corresponding to the symbol. A signature is dependent on programing language semantics and describes a corresponding symbol.

Figures 3A, 3B:
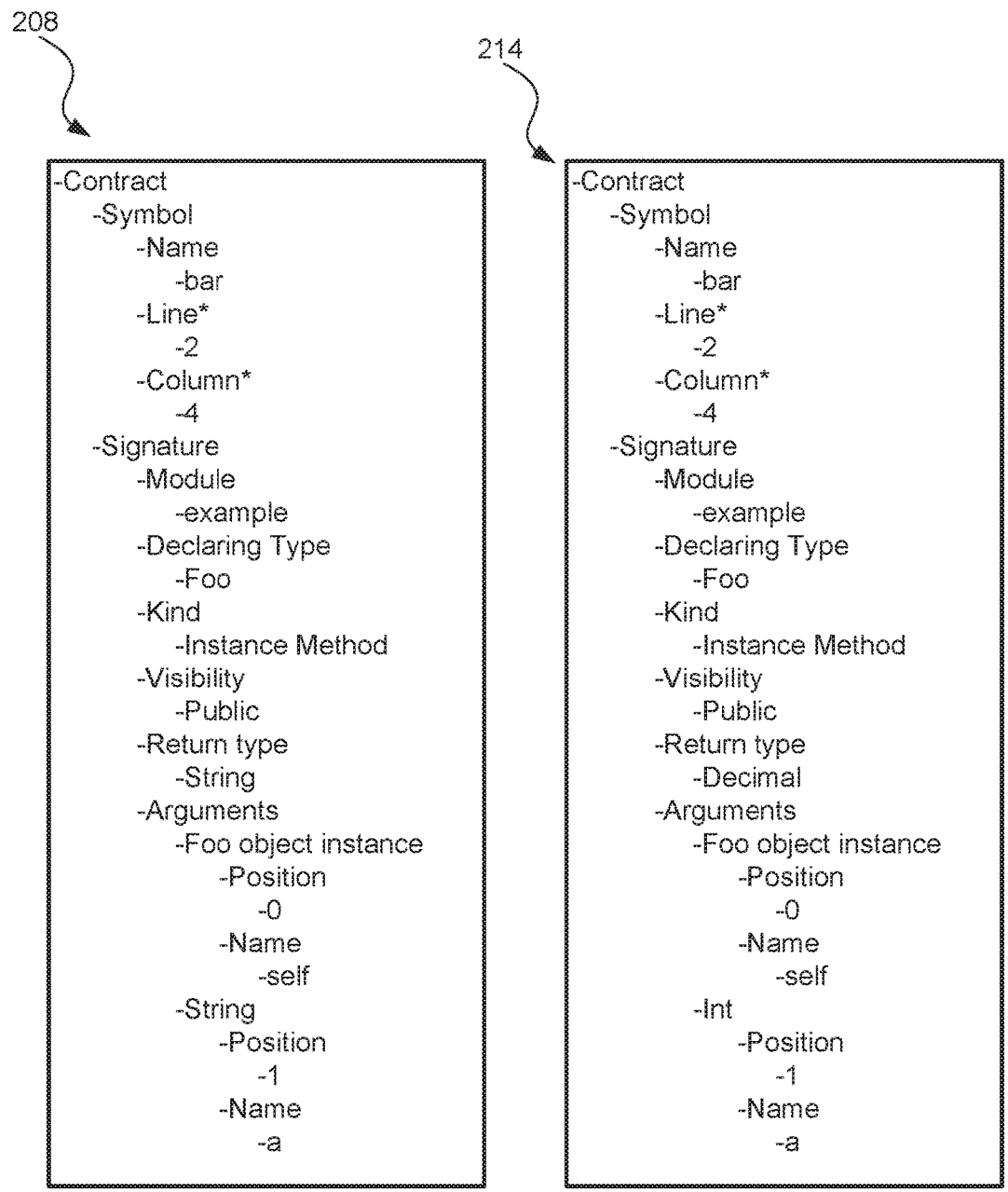
FIG. 3A is a diagram of an example abstract syntax tree generated in association with a first version of the application dependency.
FIG. 3B is a diagram of an example abstract syntax tree generated in association with a second version of the application dependency.

FIG. 3A is a diagram of an example abstract syntax tree 208 generated in association with first version of application dependency 106, and FIG. 3B is a diagram of an example abstract syntax tree 214 generated in association with second version of application dependency 108. First set of contracts 218 includes a first contract 218A, which includes a symbol "Foo," which is the name of a class, and a corresponding signature "class <class name> (object)," and a second contract 218B, which includes a symbol "bar," which is a method of the class "Foo," and a corresponding signature "def <method name> (self, a:str.)->str. Accordingly, "bar" is a method of class "Foo," and accepts one string parameter and returns a string value.

Second set of contracts 222 includes a first contract 222A, which includes the symbol "Foo" corresponding to a signature "class <class name> (object)," and a second contract 222B, which includes the symbol "bar" corresponding to a signature "def <method name> (self, a:int)->decimal." In second version of application dependency 108, "bar" is still an instance method of class "Foo," but now the data type of the parameter "a" has changed from a string to an integer and the return type has changed from a string to a decimal. In an example, application 104 relies on first set of contracts 218 in the following way: print(Foo().bar('42')) #u'42'. To retrieve the same results, the source code may be changed to the following: print(u'{ }'. format(Foo( ).bar(42)))#u'42'.

A developer may desire to upgrade one or more dependencies upon which application 104 depends. For example, second version of application dependency 108 may be an upgraded or newer version of first version of application dependency 106. First contract 218A of first version of application dependency 106 corresponds to first contract 222A of second version of application dependency 108. In particular, first contract 222A matches first contract 218A and replaces first contract 218A in the newer version of the application dependency. A contract matches another contract if they are the same or if substitution principles are satisfied (explained further below). Additionally, second contract 218B of first version of application dependency 106 corresponds to second contract 222B. In particular, second contract 222B is an upgraded version of second contract 218B and replaces second contract 218B in the newer version of the application dependency.

Application 104 may have been built already, using first version of application dependency 106 in this build. Accordingly, a developer may already know that first version of application dependency 106 is compatible with application 104. The developer may now desire to upgrade application 104 and use second version of application dependency 108 rather than first version of application dependency 106. It may be time consuming to rebuild application 104 using second version of application dependency 108. The present disclosure provides techniques to inform the developer regarding the transition to this new dependency, without rebuilding application 104. Each dependency may break the build if the test suite does not catch the particular error. The techniques provided in the present disclosure may prevent this breakage from occurring. Any minor discrepancies between first set of contracts 218 and second set of contracts 222 may introduce defects and errors. For example, if contract 218A expects three arguments and was changed in contract 222A to expect two arguments, this may cause an error. Test debugger 120 may detect these defects and errors by using static analyzer 122, which analyzes source code of application 104, first version of application dependency 106, and second version of application dependency 108, and detects whether or not one or more contracts between the caller and the callee is still valid.

Figure 4:
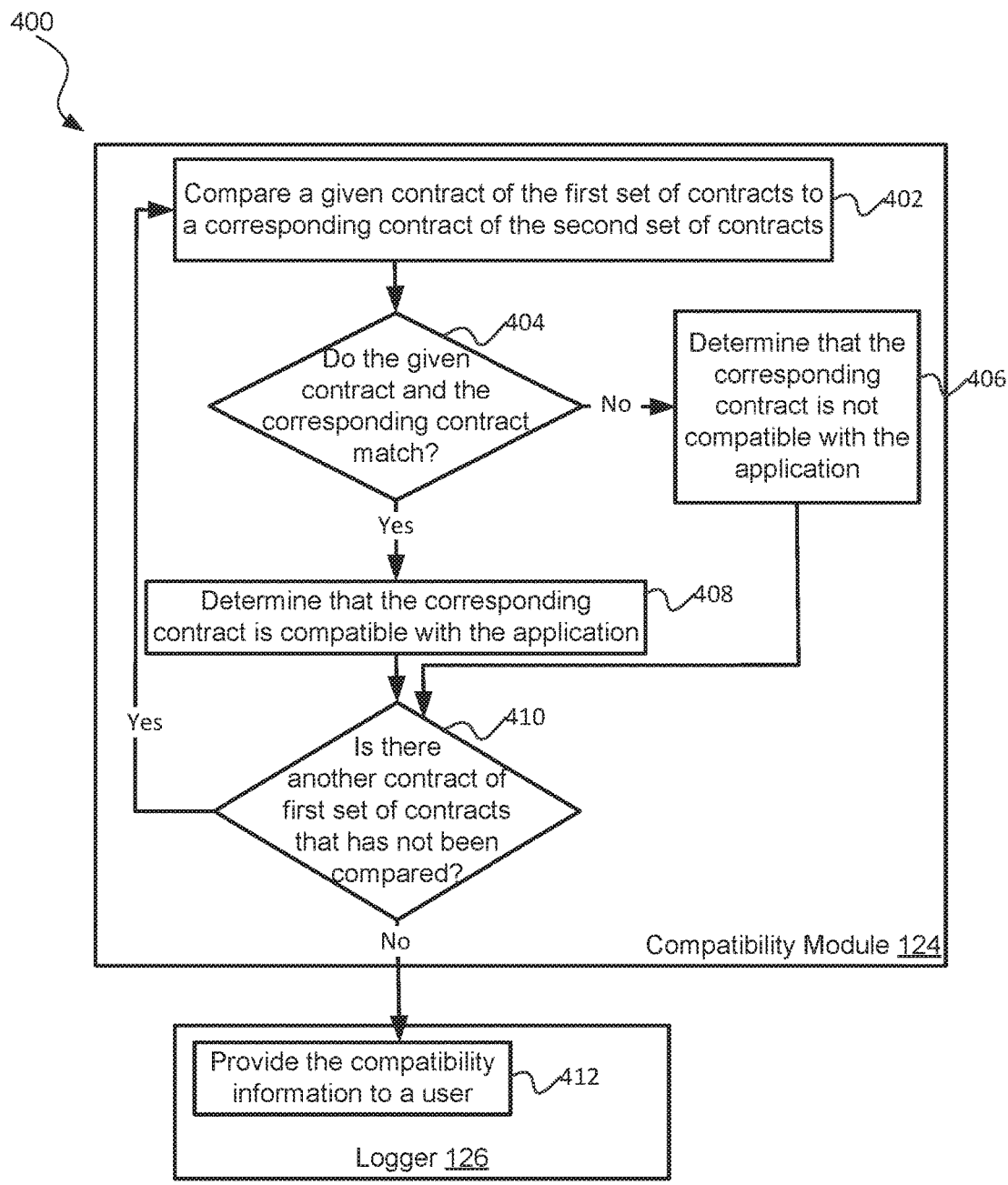
FIG. 4 is an example method flow for determining whether a new version of an application dependency is compatible with the application.

FIG. 4 is an example method flow 400 for determining whether a new version of an application dependency is compatible with application 104. Method 400 is not meant to be limiting and may be used in other applications. Method 400 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, method 400 is performed by system 100 illustrated in FIG. 1. For example, blocks of method 400 may be performed on computer system 102, which may be a client or server computer. In some examples, the order of the actions described below may also be performed according to alternative orderings. In yet other examples, additional actions may be added and actions that are described may be removed.

After first set of contracts 218 and second set of contracts 222 are known, compatibility module 124 compares them in the context of application 104 to determine whether second set of contracts 222 is compatible with application 104. Method 400 includes blocks 402, 404, 406, 408, 410, and 412. At block 402, compatibility module 124 compares a given contract of first set of contracts 218 to a corresponding contract of second set of contracts 222. At block 404, compatibility module 124 determines whether the given contract and the corresponding contract match. A contract is compatible with application 104 if the application is able to invoke the contract without breakage of the code.

In an example, compatibility module 124 compares contract 218A to corresponding contract 222A. First set of contracts 218 may be used as a reference point because it has already been determined to be compatible with application 104. Compatibility module 124 may use a variety of techniques to determine whether two contracts match. In an example, if the given contract of first set of contracts 218 is the same as the corresponding contract of second version of application dependency 108, compatibility module 124 determines that they match.

The determination of whether second version of application dependency 108 is compatible with application 104 may or may not be as simple as determining whether first set of contracts 218 is the same as second set of contracts 222, but may take into consideration the different semantics of the programming languages in which first version of application dependency 106 and second version of application dependency 108 are written. Compatibility module 124 may compare first set of contracts 218 to second set of contracts 222 in the context of the programming language in which they are written. The comparison of first set of contracts 218 to second set of contracts 222 and the determination of whether second set of contracts 222 is compatible with application 104 is programming-language dependent because each programing language may have different semantics when it comes to the data-type system used.

In some examples, in response to modification of a base class, the base class and all the code in its derived classes may be changed, recompiled, and redistributed. A base class is the class from which another class inherits, and may be referred to as fragile because changes to the base class can have unexpected results in the classes that inherit from it. Test debugger 120 may determine if second version of application dependency 108 is compatible with application 104, despite this fragile base class problem. For example, the JAVA® programming language and the C# programming language are both object-oriented programming languages with strong data-type systems.

in some examples, compatibility module 124 applies substitution principles to determine whether two contracts match. A contract matches another contract if substitution principles are satisfied (e.g., a data type in contract 218A may be substituted for another data type that is used in data type in 222A). Substitution principles may be helpful if application 104 is written in an object-oriented programming language with a strong data-type system. Substitutability is a principle in object-oriented programming stating that, in a computer program, if "S" is a subtype of "T," then objects of type "T" may be replaced with objects of type "S" (e.g., an object of the type "T" may be substituted with its subtype object of the type "S") without altering any of the desirable properties of that program (e.g., correctness, task performed, etc.). In an example, a substitution principle may specify that if a data type of a class in the source code is substituted with its superclass, the classes are compatible and the code will not break based on this substitution. In this example, the substitution principle is satisfied.

In some examples, a substitute refers to the usage as per Liskov Substitution Principle (LSP) and the particular semantics that are handled separately for each language depending on the covriance and contravariance semantics in that particular language. LSP is a particular definition of a subtyping relation, called (strong) behavioral subtyping. It is a semantic rather than merely syntactic relation because it intends to guarantee semantic interoperability of types in a hierarchy, object types in particular. Variance may refer to how subtyping between more complex types (e.g., list of type "S" versus list of type "T," function returning type "S" versus function returning Type "T") relates to subtyping between their components. Depending on the variance of the type constructor, the subtyping relation may be preserved, reversed, or ignored. For example, a list of type "S" may be a subtype of a list of Type "T" because the list constructor is covariant, while a "function from type 'T' to String" is a subtype of a "function from type 'S' to String" because the function type constructor is contravariant in the argument type. In some examples, first version of application dependency 106 is an API including a data type "T1," and second version of application dependency 108 is a newer version of the API including a data type "T2." In an example, the substitution principle is satisfied if the data type "T2" derives from the data type "T1." Alternatively, the substitution principle is not satisfied if the data type "T2" does not derive from the data type "T1."

Inheritance also applies to interfaces. The term "interface" may relate to programming languages such as JAVA, Ada, and C#, but it should be understood that different programming languages may use different terminology for this feature. For example, an "interface" as it is used in JAVA is referred to as a "protocol" in Objective-C and Smalltalk and is referred to as a "trait" in Rust. Accordingly, although the term "interface" is used in some examples, this is not intended to be limiting, and it should be understood that these examples apply to semantic constructs that extend the behavior of the object but cannot alter the data layout of it.

In an example, a programming language may allow a new interface to be defined. If a new interface is defined, a new reference data type is defined. An interface name may be used anywhere other data type names are used. In an example, first version of application dependency 106 includes a data type "A" that implements the new interface. If the data type "A" included in first version of application dependency 106 is now a data type "B" in second version of application dependency 108, compatibility module 124 may determine whether the data type "B" is able to implement the new interface. In some examples, the data type "A" implements an interface "C" and an interface "D," and interfaces "C" and "D" inherit from an interface "E." Interface "E" in second version of application dependency 108 may be different from the one in first version of application dependency 106. For example, interface "E" may have been modified to remove one or more functions or to add one or more new functions or new methods in interface "E." Compatibility module 124 may determine whether data type "A" can be replaced by data type "B" to determine whether second set of contracts 222 is compatible with application 104. In an example, compatibility module 124 determines whether the data type "B" is able to implement the new methods added to interface "E." If the data type "B" is unable to implement the new methods, the substitution principle is not satisfied and second set of contracts 222 is incompatible with application 104. If the data type "B" is able to implement the new methods, the substitution principle is satisfied and second set of contracts 222 is compatible with application 104.

Additionally, the present disclosure may take into consideration the context in which code executes. A pointer is a variable that contains the address in memory of another variable, For example, a function may use a void pointer, and compatibility module 124 may take into consideration such places or locations in the code that include the void pointer. Based on this information, compatibility module 124 may estimate how many different types are used. in the void pointer because it may point where any function is involved. It may be difficult to estimate whether a new version of an application dependency that uses a pointer will break because pointers may point to any variable type. During the execution of the program, it may determine the data type to which the pointer points. Static analyzer 122 may assist in determining this data type by based on the context in which the code is executed. Based on this determination, compatibility module 124 may determine whether second set of contracts 222 is compatible with application 104.

In some examples, compatibility module 124 determines whether contract 218B matches contract 222B. Contract 218B may not match contract 222B because the signature of the first argument in contract 218B has been changed from a string to an integer. The updated "bar" method in contract 222B expects an integer, but will receive a string that is passed in. Compatibility module 124 may determine whether a substitute is available for the string data type. If a substitute is available, compatibility module 124 determines whether the substitute is used in contract 222B. If so, compatibility module 124 may determine that the substitution principle is satisfied and thus, contract 222B matches contract 218B. If no substitution is available (no substitute is available for the string data type in contract 218B) or if the integer data type is not a substitute for the string data type, compatibility module 124 may determine that the substitution principle is not satisfied and thus, contract 222B does not match contract 218B.

In FIG. 4, if the given contract of first version of application dependency 106 does not match the corresponding contract, method flow 400 proceeds from block 404 to block 406, at which compatibility module 124 determines that the corresponding contract is not compatible with application 104. If the given contract of first version of application dependency 106 matches the corresponding contract, method flow 400 proceeds from block 404 to block 410, at which compatibility module 124 determines that the corresponding contract is compatible with application 104.

At block 410, compatibility module 124 determines whether a contract of first set of contracts 218 has not yet been compared to a corresponding contract of second set of contracts 222. If so, method flow 400 proceeds from block 410 to block 402; if not, method flow 400 proceeds to from block 410 block 412.

After all contracts of first set of contracts 218 have been compared, process flow 400 proceeds from block 410 to block 412, at which logger 126 provides the compatibility information to a user. If each contract of first version of application dependency 106 matches a corresponding contract of second version of application dependency 108, logger 126 provides an indication that second set of contracts 222 is compatible with application 104. If a contract of first version of application dependency 106 does not match a corresponding contract of second version of application dependency 108, logger 126 provides an indication that second set of contracts 222 is not compatible with application 104. This non-matching contract may be the cause of a breakage during the build. During the continuous integration process, if second version of application dependency 108 is not compatible with application 104, then application 104 will fail to build.

Logger 126 may present the debug information in the form of logs or context files with information about the defects, without the actual rebuild of application 104. Logger 126 may provide an indication of the compatibility/incompatibility in a variety of ways. In an example, logger 126 provides a singular "compatible" or "incompatible" indication in the log. In another example, logger 126 provides a list of broken contracts between first version of application dependency 106 and second version of application dependency 108.

Additionally, if multiple versions of an application dependency are tested for compatibility with application 104, logger 126 may provide information regarding the spectrum of its changes. Accordingly, developers may view the changes made to an application dependency across different versions.

Test debugger 120 may provide a developer with a clearer picture of the symbols, signatures, and contracts application 104 uses from first version of application dependency 106 and/or second version of application dependency 108. In some examples, the developer may decide to change second version of application dependency 108 to be compatible with application 104. The developer may know where to make these changes based on the information provided in the debug information. The developer may be aware of first version of application dependency 106 and its contracts that were compatible with and used by application 104. For example, the developer may change the data type of the first argument in contract 222B from an integer to a string (like in contract 218B) and also change the return type of contract 2B from a decimal to a string (like in contract 218B).

Figure 5:
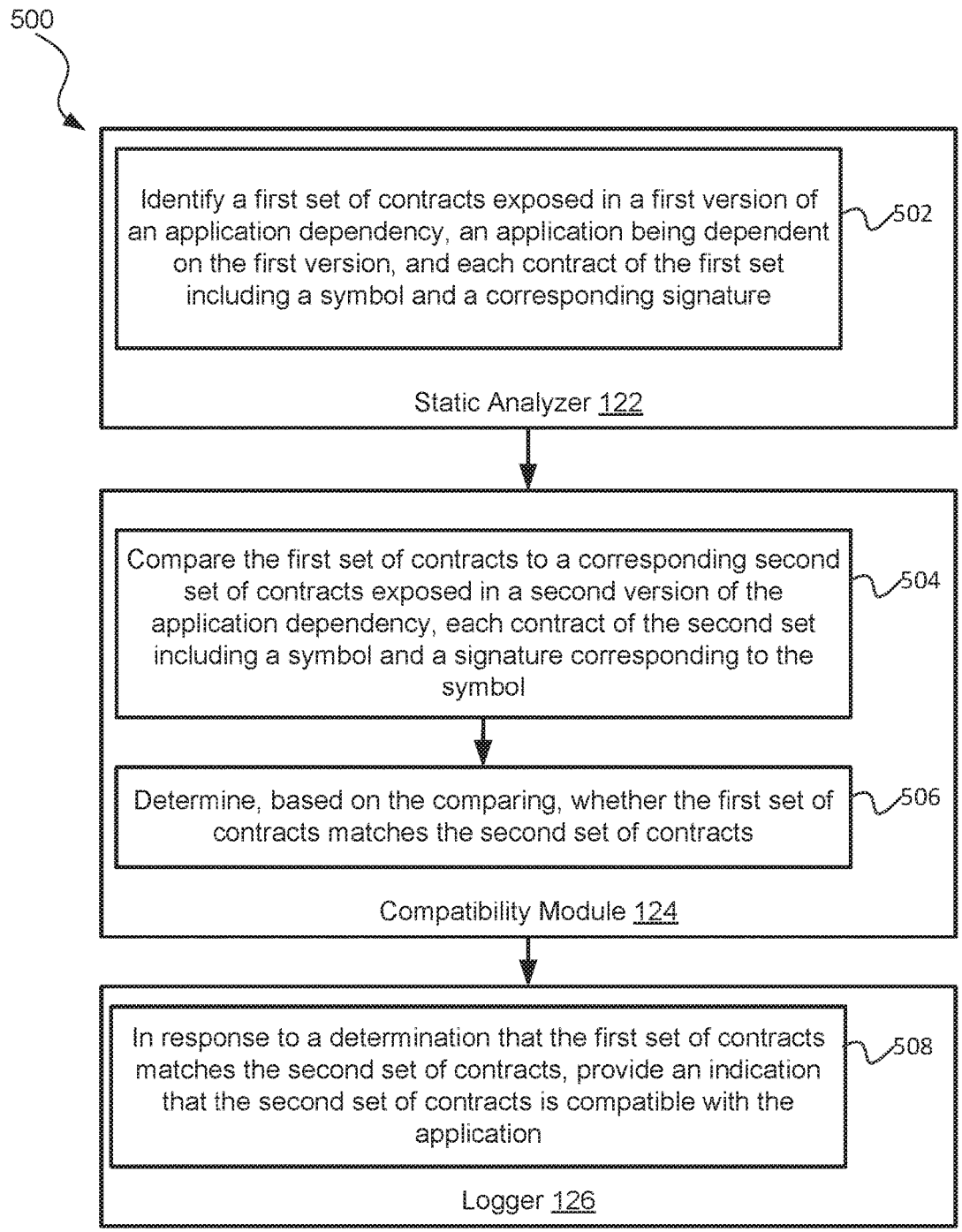
FIG. 5 is an example method flow for detecting defects in an application dependency upon which an application depends, without rebuilding the application with the application dependency.

FIG. 5 is an example method flow 500 for detecting defects in an application dependency upon which an application depends, without rebuilding the application with the application dependency. Method 500 is not meant to be limiting and may be used in other applications. Method 500 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, method 500 is performed by system 100 illustrated in FIG. 1. For example, blocks of method 500 may be performed on computer system 102, which may be a client or server computer. In some examples, the order of the actions described below may also be performed according to alternative orderings. In yet other examples, additional actions may be added and actions that are described may be removed.

Method 500 includes blocks 502-508. At block 502, static analyzer 122 identifies first set of contracts 218 exposed in first version of application dependency 106, application 104 being dependent on first version of application dependency 106, and each contract of first set of contracts 218 including a symbol and a corresponding signature. At block 504, compatibility module 124 compares first set of contracts 218 to a corresponding second set of contracts 222 exposed in second version of application dependency 108, each contract of second version of application dependency 108 including a symbol and a corresponding signature.

At block 506, compatibility module 124 determines, based on the comparing, whether first set of contracts 218 matches second set of contracts 222. In an example, compatibility module 124 compares first set of contracts 218 to second set of contracts 222. For each contract of first set of contracts 218, compatibility module 124 may determine that the respective contract matches the corresponding contract of second set of contracts 222 if the respective contract is the same as the corresponding contract. In some examples, for each contract of first set of contracts 218, compatibility module 124 determines that the respective contract of first set of contracts 218 matches the corresponding contract of second set of contracts 222 if a substitution principle is satisfied. Additionally, compatibility module 124 may determine that the respective contract of first set of contracts 218 does not match the corresponding contract if no substitution principles are satisfied and if the respective contract is not the same as the corresponding contract. In response to a determination that each contract of first set of contracts 218 matches the corresponding contract of second set of contracts 222, compatibility module 124 determines that first set of contracts 218 matches second set of contracts 222. In response to a determination that a contract of first set of contracts 218 does not match the corresponding contract of second set of contracts 222, compatibility module 124 may determine that first set of contracts 218 does not match second set of contracts 222.

At block 508, in response to a determination that first set of contracts 218 matches second set of contracts 222, logger 126 provides an indication that second set of contracts 222 is compatible with application 104. As discussed above, method 500 may include other actions or blocks not included in FIG. 5. For example, in response to a determination that first set of contracts 218 does not match second set of contracts 222, logger 126 provides an indication that second set of contracts 222 is not compatible with application 104.

Figure 6:
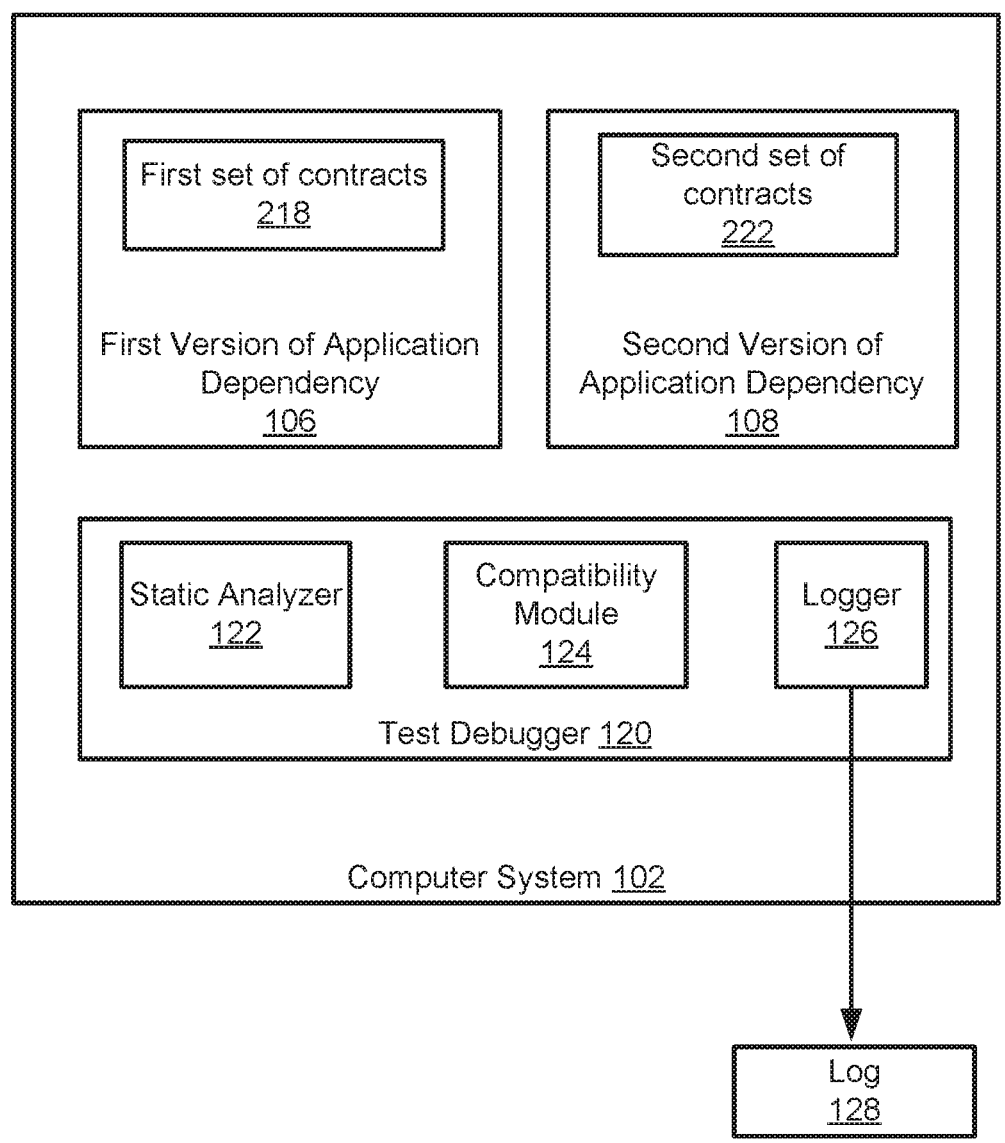
FIG. 6 is an example method flow for determining whether a contract exposed in a new version of an application dependency is compatible with the application, without rebuilding the application with the new version.

FIG. 6 is an example block diagram 600 for determining whether a contract exposed in second version of application dependency 108 is compatible with application 104, without rebuilding the application with the second version. In the example illustrated in FIG. 6, static analyzer 122 identifies first set of contracts 218 exposed in first version of application dependency 106. Application 104 is dependent on first version of application dependency 106, and each contract of first set of contracts 218 includes a symbol and a corresponding signature.

In some examples, compatibility module 124 compares first set of contracts 218 to a corresponding second set of contracts 222 exposed in second version of application dependency 108. Compatibility module 124 determines, based on the one or more comparisons, whether first set of contracts 218 matches second set of contracts 222. Each contract of second set of contracts 222 includes a symbol and a corresponding signature. A first contract may match a second contract if they are the same. Additionally, the first contract may match a second contract if they satisfy substitutions principles. In response to a determination that first set of contracts 218 does not match second set of contracts 222, logger 126 may provide an indication that second set of contracts 222 is not compatible application 104. In response to a determination that first set of contracts 218 matches second set of contracts 222, logger 126 may provide an indication that second set of contracts 222 is compatible application 104. Logger 126 may provide these one or more indications in a log 128.

In various implementations, system 100 may be a client or server computing device including one or more CPUs 112. The client or server computing device may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

The computing device (e.g., system 100) may include a bus or other communication mechanism for communicating information data, signals, and information between various components of computer system. The components may include an input/output (I/O) component that processes a user action, such as selecting keys from a keypad/keyboard, selecting one or more buttons or links, etc., and sends a corresponding signal to the bus. The I/O component may also include an output component such as a display, and an input control such as a cursor control (such as a keyboard, keypad, mouse, etc.). An audio I/O component may also be included to allow a user to use voice for inputting information by converting audio signals into information signals. Audio I/O component may allow the user to hear audio.

A transceiver or network interface may transmit and receive signals between the client or server computing device and other devices via a communications link to a network. In an example, the transmission is wireless, although other transmission mediums and methods may also be suitable, CPU 112, which may be a micro-controller, digital signal processor (DSP), or other processing component, processes these various signals, such as for display on the client device or transmission to other devices via the communications link. CPU 112 may also control transmission of information, such as cookies or IP addresses, to other devices.

Components of the client or server computing device may also include a system memory component (e.g., RAM), a static storage component (e.g., ROM), and/or a disk drive. Computer system 102 performs specific operations by CPU 112 and other components by executing one or more sequences of instructions contained in the system memory component (e.g., memory 114). Logic may be encoded in a computer readable medium, which may refer to any medium that participates in providing instructions to CPU 112 for execution. Such a medium may take many forms, including but not limited to, non-volatile media, volatile media, and transmission media. In various implementations, non-volatile media includes optical, or magnetic disks, or solid-state drives, volatile media includes dynamic memory, such as the system memory component, and transmission media includes coaxial cables, copper wire, and fiber optics, including wires that include the bus. In an example, the logic is encoded in a non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In some examples, execution of instruction sequences (e.g., method 400 or 500) to practice the present disclosure may be performed by the client or server computing device. In various other examples of the present disclosure, a plurality of host machines coupled by the communications link to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various examples provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various blocks, actions, or steps described herein may be changed, combined into composite blocks, actions, or steps, and/or separated into sub-blocks, sub-actions, or sub-steps to provide features described herein.

The foregoing disclosure is not intended to limit the present disclosure to the precise forms or particular fields of use disclosed. As such, it is contemplated that various alternate examples and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of detecting incompatibility between an application and an application dependency, comprising:
   identifying a first set of contracts exposed in a first version of an application dependency, an application being dependent on the first version, and each contract of the first set including a symbol and a corresponding signature;
   performing static analysis on a second version of the application dependency to identify a corresponding second set of contracts exposed in the second version, each contract of the second set including a symbol and a corresponding signature;
   comparing the first set of contracts to the corresponding second set of contracts;
   determining, based on the comparing, whether the first set of contracts matches the second set of contracts, wherein determining whether the first set of contracts matches the second set of contracts includes:
      determining that a first signature of the first set of contracts is different from a second signature of the second set of contracts, the first signature corresponding to the second signature;
      determining whether the first and second signatures satisfy any substitution principles, wherein the first signature includes a first data type in a first contract of the first set of contracts, the first data type is substituted for a second data type in a second contract of the second set of contracts, and a substitution principle specifies that if the first data type is substituted for the second data type, the substitution principle is satisfied;
      in response to a determination that the first and second signatures satisfy a substitution principle, determining that the first contract matches the second contract; and
      in response to a determination that the first and second signatures do not satisfy any substitution principles, determining that the first contract does not match the second contract; and
   in response to a determination that the first set of contracts matches the second set of contracts, providing an indication that the second set of contracts is compatible with the application.

2. The method of claim 1, comprising:
   in response to a determination that the first set of contracts does not match the second set of contracts, providing an indication that the second set of contracts is not compatible with the application.

3. The method of claim 1, wherein the first version of the application dependency is compatible with the application.

4. The method of claim 1, wherein the performing static analysis further comprises:
   analyzing source code of the second version of the application dependency; and
   identifying the second set of contracts based on analyzing the source code of the second version of the application.

5. The method of claim 1, further comprising:
   analyzing source code of the application and source code of the first version of the application dependency; and
   identifying the first set of contracts based on the analyzing, wherein the first set of contracts is invoked by the application.

6. The method of claim 1, wherein determining whether the first set of contracts matches the second set of contracts includes:
   for one or more contracts of the first set of contracts, determining that the respective contract matches the corresponding contract of the second set of contracts if the respective contract is the same as the corresponding contract; and
   in response to a determination that each contract of the first set of contracts matches the corresponding contract of the second set of contracts, determining that the first set of contracts matches the second set of contracts.

7. The method of claim 1, wherein determining whether the first set of contracts matches the second set of contracts includes:
   for one or more contracts of the first set of contracts:
      determining that the respective contract of the first set of contracts matches the corresponding contract of the second set of contracts if a substitution principle is satisfied; and
      determining that the respective contract of the first set of contracts does not match the corresponding contract if no substitution principles are satisfied and if the respective contract is different from the corresponding contract; and
   in response to a determination that a contract of the first set of contracts does not match the corresponding contract of the second set of contracts, determining that the first set of contracts does not match the second set of contracts.

8. The method of claim 1, wherein each contract of the first set of contracts is invoked by the application.

9. The method of claim 1, further including:
   performing static analysis on the first version of the application dependency to identify the first second set of contracts.

10. The method of claim 1, where the first data type includes a class, the first data type is substituted for a superclass of the class in the second contract, and the substitution principle specifies that if the first data type is substituted for the superclass, the substitution principle is satisfied.

11. A system, comprising:
   a non-transitory memory; and
   one or more hardware processors coupled to the non-transitory memory and configured to read instructions from the non-transitory memory to cause the system to perform operations comprising:
      identifying a first set of contracts exposed in a first version of an application dependency;
      performing static analysis on a second version of the application dependency, wherein an application is dependent on the first version and the second version, and each contract of the first set includes a symbol and a corresponding signature;

comparing the first set of contracts to a corresponding second set of contracts exposed in the second version of the application dependency, wherein each contract of the second set includes a symbol and a corresponding signature;

determining, based on the comparing, whether the first set of contracts matches the second set of contracts, wherein determining whether the first set of contracts matches the second set of contracts includes:

determining that a first signature of the first set of contracts is different from a second signature of the second set of contracts;

determining whether the first and second signatures satisfy any substitution principles, wherein the first signature includes a first data type in a first contract of the first set of contracts, the first data type is substituted for a second data type in a second contract of the second set of contracts, and a substitution principle specifies that if the first data type is substituted for the second data type, the substitution principle is satisfied;

in response to a determination that the first and second signatures satisfy a substitution principle, determining that the first contract matches the second contract; and in response to a determination that the first and second signatures do not satisfy any substitution principles, determining that the first contract does not match the second contract, wherein the first signature corresponds to the second signature; and in response to a determination that the first set of contracts does not match the second set of contracts, providing an indication that the second set of contracts is not compatible with the application.

12. The system of claim 11, wherein the operations further comprise:
in response to a determination that the first set of contracts matches the second set of contracts, providing an indication that the second set of contracts is compatible with the application.

13. The system of claim 11, wherein the first version of the application dependency is an application package or a library.

14. The system of claim 11, wherein the first version of the application dependency is an application programming interface (API) exposed by a second application.

15. The system of claim 11, wherein the operations further comprise:
determining whether the first set of contracts matches the second set of contracts based on the one or more comparisons and not based on a rebuild of the application.

16. The system of claim 11, wherein the operations further comprise:
determining whether the first set of contracts matches the second set of contracts based on the one or more comparisons and not based on an execution of the second version of the application dependency.

17. The system of claim 11, wherein the operations further comprise:
writing the indication to a log.

18. The system of claim 11, wherein the operations further comprise:
parsing source code of the application and source code of the first version of the application dependency to identify the first set of contracts invoked by the application.

19. The system of claim 11, where the first data type includes a class, the first data type is substituted for a superclass of the class in the second contract, and the substitution principle specifies that if the first data type is substituted for the superclass, the substitution principle is satisfied.

20. A non-transitory machine-readable medium comprising a plurality of machine-readable instructions that when executed by one or more processors is adapted to cause the one or more processors to perform a method comprising identifying a first set of contracts exposed in a first version of an application dependency, an application being dependent on the first version, and each contract of the first set including a symbol and a corresponding signature;

performing static analysis on a second version of the application dependency to identify a corresponding second set of contracts exposed in the second version, each contract of the second set including a symbol and a corresponding signature;

comparing the first set of contracts to the corresponding second set of contracts;

determining, based on the comparing, whether the second set of contracts is compatible with the application, wherein determining whether the first set of contracts matches the second set of contracts includes:

determining that a first signature of the first set of contracts is different from a second signature of the second set of contracts, the first signature corresponding to the second signature;

determining whether the first and second signatures satisfy any substitution principles, wherein the first signature includes a first data type in a first contract of the first set of contracts, the first data type is substituted for a second data type in a second contract of the second set of contracts, and a substitution principle specifies that if the first data type is substituted for the second data type, the substitution principle is satisfied;

in response to a determination that the first and second signatures satisfy a substitution principle, determining that the first contract matches the second contract; and in response to a determination that the first and second signatures do not satisfy any substitution principles, determining that the first contract does not match the second contract; and in response to a determination that the second set of contracts is not compatible with the application, providing an indication that the second set of contracts is not compatible with the application.

* * * * *